United States Patent [19]
Perret et al.

[11] Patent Number: 6,077,905
[45] Date of Patent: *Jun. 20, 2000

[54] IMPACT-RESISTANT INJECTED POLYAMIDE COMPONENTS

[75] Inventors: Patrice Perret, Puteaux; Alain Bouilloux, Bernay, both of France

[73] Assignee: Elf Atochem S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/843,590

[22] Filed: Apr. 16, 1997

[30] Foreign Application Priority Data

Apr. 16, 1996 [FR] France ................... 96 04718

[51] Int. Cl.[7] .................................... C08L 77/00
[52] U.S. Cl. ............................. 525/66; 525/182
[58] Field of Search ....................... 525/182, 66

[56] References Cited

U.S. PATENT DOCUMENTS

| | | | |
|---|---|---|---|
| 3,849,504 | 11/1974 | Mitsch | 260/615 |
| 4,131,726 | 12/1978 | Martin | 526/18 |
| 4,174,358 | 11/1979 | Epstein | 525/183 |
| 5,070,145 | 12/1991 | Guerdoux | 525/179 |
| 5,670,575 | 9/1997 | Flexman, Jr. | 525/66 |

FOREIGN PATENT DOCUMENTS

| | | |
|---|---|---|
| 0 002 761 | 12/1978 | European Pat. Off. . |
| 0 052 796 | 10/1981 | European Pat. Off. . |
| 0 096 264 | 5/1983 | European Pat. Off. . |
| 0 195 946 | 2/1986 | European Pat. Off. . |
| 0 564 338 | 3/1993 | European Pat. Off. . |
| 2 292 016 | 12/1974 | France . |

*Primary Examiner*—Ana Woodward

[57] ABSTRACT

The invention relates to injected components based on polyamide resin (A) and on at least one copolymer (B) of ethylene and of an unsaturated epoxide, the copolymer (B) being obtained by copolymerization or by grafting the epoxide. The copolymer (B) is advantageously an ethylene/alkyl (meth)acrylate/glycidyl (meth)acrylate copolymer. The melt flow index of the compositions containing (A) and (B) is greater than the ratio of the melt flow index of (A) over 0.175 times the weight percentage of (B).

11 Claims, No Drawings

IMPACT-RESISTANT INJECTED POLYAMIDE COMPONENTS

FIELD OF THE INVENTION

The present invention relates to injected components based on polyamide resin (A) and on at least one copolymer (B) of ethylene and of an unsaturated epoxide, the copolymer (B) being obtained by copolymerization or by grafting the epoxide.

BACKGROUND OF THE INVENTION

The improvement in the impact strengths of polyamides is generally obtained by incorporation, in the form of a dispersed phase, of an impact modifier which exhibits an elastomeric nature and reactive functional groups (acrylic acid, maleic anhydride and the like) capable of reacting with functional groups of the polyamide matrix. This reactivity makes it possible to ensure a fine and homogeneous dispersion of the elastomer and a good adhesion at the nodule-matrix interface but results in a significant fall in the fluidity. This large change in the viscosity is harmful to the use, especially for fine or large-sized injected components.

DESCRIPTION OF THE INVENTION

Applicant has discovered that, by using compositions based on polyamide resin and on at least one copolymer of ethylene and of an unsaturated epoxide, it was possible to obtain both an impact strength and a good fluidity making possible the injection of these compositions.

Descriptions have already been given in the prior art of polyamide-based impact-resistant compositions.

EP 96,264 describes polyamides with a viscosity of between 2.5 and 5 reinforced by ethylene/$C_2$ to $C_8$ alkyl (meth)acrylate/unsaturated acid or anhydride copolymers and comprising 20 to 40% by weight of acrylate.

EP 2,761 describes polyamides reinforced by polyethylenes or copolymers of ethylene grafted with (meth)acrylic acid or its derivatives or maleic anhydride and optionally polyethylene.

EP 52,796 describes polyamides reinforced by (i) an α-olefin/unsaturated carboxylic acid copolymer, (ii) an α-olefin/alkyl ester of unsaturated carboxylic acid copolymer and (iii) a metal compound.

FR 2,292,016 describes polyamides reinforced by a mixture of copolymers of α-olefins and of esters of unsaturated carboxylic acids or their derivatives.

U.S. Pat. No. 5,070,145 describes polyamides reinforced by a mixture (i) of a polyethylene or of an ethylene/alkyl (meth)acrylate copolymer and (ii) of an ethylene/alkyl (meth)acrylate/maleic anhydride copolymer.

U.S. Pat. No. 4,174,358 describes reinforced polyamides which are provided in the form of a polyamide matrix in which are dispersed nodules of less than 1 μm having a certain modulus which has also to be a fraction of the modulus of the polyamide. A great many reinforcing agents are described, some having epoxide functional groups. The majority are polymers having neutralized anhydride or acid functional groups or are mixtures based on EPDM. No examples are given of the polymers containing epoxide functional groups. All these reinforcing agents are presented as equivalent.

This whole prior art gives examples only of reinforcing agents having acid or acid anhydride functional groups or EPDMs and no mention is made of the viscosity of the reinforced polyamides. It will be seen in the comparative examples of the present invention that the behaviour of the modifying agents of the prior art has no connection with that of the modifying agents of the present invention.

EP 564,338 describes polyamides reinforced (i) by ethylene/alkyl (meth)acrylate/glycidyl methacrylate copolymers and (ii) optionally by polyethylenes, ethylene/alkyl (meth)acrylate copolymers or ethylene/alkyl (meth)acrylate/unsaturated dicarboxylic acid anhydride copolymers. This prior art is only concerned with the impact strength and not with the viscosity. It is clear, from the table of examples (Example 6), that it is advantageous to mix a reinforcing agent having epoxide functional groups with a reinforcing agent having anhydride functional groups, in order to cause crosslinking of the dispersed phase which gives significant impact strengths but to the detriment of the viscosity. The tests were carried out on injection-moulded test specimens with dimensions of 4×10×80 mm³.

It is clear that, with respect to such dimensions and under laboratory conditions, the viscosity is not important.

It is a completely different case for fine or larger-sized components or alternatively components with a complicated shape, these components having to be produced at industrial output rates.

The advantage of the compositions of the invention is the compromise between the impact strength and the viscosity. Another advantage is that it is sufficient to add a single product to the polyamide resin and not a mixture of different products. Another advantage is that it is sufficient to add the copolymer of ethylene and of an unsaturated epoxide to the extruder which feeds the injection device. This addition can be made via a side extruder or a granule metering device on the polyamide extruder. It is thus unnecessary to prepare in advance the mixture of the polyamide resin and of the strength-improver.

The present invention thus relates to injected components based on polyamide resin (A) and on at least one copolymer (B) of ethylene and of an unsaturated epoxide. Some of the compositions used for these injected components are novel. The invention also relates to these compositions.

Polyamide is understood to mean the condensation products:

of one or a number of amino acids, such as aminocaproic, 7-aminoheptanoic, 11-aminoundecanoic and 12-dodecanoic acids, or of one or a number of lactams, such as caprolactam, oenantholactam and lauryllactam;

of one or a number of salts or mixtures of diamines, such as hexamethylenediamine, dodecamethylenediamine, meta-xylylenediamine, bis-p-aminocyclohexylmethane and trimethylhexamethylenediamine, with diacids, such as isophthalic, terephthalic, adipic, azeleic, suberic, sebacic and dodecanedicarboxylic acids or of mixtures of some of these monomers which results in copolyamides.

For example, the condensation of caprolactam and of lauryllactam produces PA-6/12. The invention advantageously relates to PA-6 (polyeaprolactam), PA-6,6 (poly (hexamethylene adipamide)), PA-11 (poly (aminoundecanoic acid)), PA-12 (polylauryllactam) and PA-6/12. It is more particularly useful for PA-6 and PA-6,6.

The copolymer of ethylene and of an unsaturated epoxide can be obtained by copolymerization of ethylene and of an unsaturated epoxide or by grafting the unsaturated epoxide onto the polyethylene. The grafting can be carried out in the solvent phase or on the molten polyethylene in the presence of a peroxide. These grafting techniques are known in themselves. As regards the copolymerization of ethylene and of an unsaturated epoxide, use may be made of the processes known as radical polymerization processes which generally operate at pressures between 200 and 2,500 bars.

Mention may be made, as examples of unsaturated epoxides, of:

aliphatic glycidyl esters and ethers, such as allyl glycidyl ether, vinyl glycidyl ether, glycidyl maleate and itaconate or glycidyl (meth)acrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

The copolymer of ethylene and of unsaturated epoxide can also comprise other monomers which can be chosen, for example, from:

α-olefins, such as propylene, 1-butene, hexene, and the like vinyl esters of saturated carboxylic acids, such as vinyl acetate or vinyl propionate esters of unsaturated carboxylic acids, such as esters of (meth)acrylic acid and of alcohols which can have up to 24 carbons.

By way of example, the unsaturated epoxide can be grafted onto the following polymers:

polyethylene, copolymers of ethylene and of an α-olefin, polyethylenes, such as VLDPE (very low density PE), ULDPE (ultra low density PE) or metallocene PE;

copolymers of ethylene and at least one saturated carboxylic acid vinyl ester, such as vinyl acetate or vinyl propionate;

copolymers of ethylene and of at least one unsaturated carboxylic acid ester, such as esters of (meth)acrylic acid and of alcohols which can have up to 24 carbons;

EPR (ethylene/propylene rubber) or EPDM (ethylene/propylene/diene) elastomers;

mixtures of polymers chosen from the above.

The amount of copolymer (B) can vary within wide limits depending on the properties which are required for the mixture of (A) and (B); amounts up to 25% by weight of (A)+(B) are, however, sufficient and advantageously between 10 and 20%.

Applicant has discovered that, at an identical epoxide content and while varying the amount of copolymer (B) from 10 to 20%, the benefit obtained beyond 15% was much lower than the benefit obtained when moving from 10 to 15%, whereas the melt flow index fell markedly.

Applicant has also discovered, at a constant amount of copolymer (B), the impact strength showed absolutely no proportionality with the amount of epoxide in the copolymer (B).

The variation in impact strength is approximately 5% when the amount of epoxide is reduced from 8 to 2% by weight (B). For PA-6, the Charpy impact at −20° C. and −40° C., this variation is an improvement.

The amount of epoxide in the copolymer (B) can vary and can be up to 10% by weight of (B), advantageously from 0.1 to 8%.

The present invention thus also relates to impact-resistant polyamide resin compositions comprising a polyamide (A) and an amount of copolymer (B) such that their melt flow index (MFI) is greater than the ratio of the melt flow index of the polyamide (A) over 0.175 times the weight percentage of the copolymer (B) [$MFI_{(A+B)} > MFI(A)/0.175 \times \% (B)$].

The melt flow index of these resins (A) comprising (B) is also lower than the melt flow index of the polyamide (A).

For example, 15 weight % of (B) are added to a PA-6 with an MFI of 21 and the MFI of the PA-6 comprising 15% of (B) is greater than $21/(0.175 \times 15) = 8$.

By way of example, the amounts of (B) are between 5 and 25% by weight of (A)+(B) and advantageously 10 and 20%.

The present invention also relates to impact-resistant polyamide resin compositions comprising a polyamide (A) and a sufficient amount of copolymer (B) for the Charpy impact strength at −40° C. to be from 3 to 6 times that of the polyamide (A) alone, the amount of epoxide in the copolymer (B) being such that the melt flow index of these compositions (A)+(B) is greater than the ratio of the melt flow index of (A) alone over 0.175 times the weight percentage of the copolymer (B).

By way of example, the amount of copolymer (B) is not greater than 25% by weight of (A)+(B), advantageously between 10 and 20%.

The amount of epoxide in the copolymer (B) can be between 0.1 and 10% of the weight of (B), advantageously from 0.1 to 8 and preferably from 0.1 to 3%.

The copolymer (B) of the injected components of the invention and of the two above impact-resistant polyamide resin compositions is advantageously an ethylene/alkyl (meth)acrylate/unsaturated epoxide copolymer.

It can advantageously contain up to 40% by weight of alkyl (meth)acrylate and up to 10% by weight of unsaturated epoxide, preferably 0.1 to 8%.

The epoxide is advantageously glycidyl (meth)acrylate.

The alkyl (meth)acrylate is advantageously chosen from methyl (meth)acrylate, ethyl acrylate, n-butyl acrylate, isobutyl acrylate and 2-ethylhexyl acrylate.

The amount of alkyl (meth)acrylate is advantageously from 20 to 35%.

This copolymer can be obtained by radical polymerization of the monomers.

It would not be departing from the scope of the invention to add inorganic fillers (talc, $CaCO_3$, kaolin, and the like), reinforcements (glass fibre, inorganic fibre, carbon fibre, and the like), stabilizers (heat, UV), flame-retardant agents and dyes.

The compositions of the invention are prepared by conventional thermoplastic techniques, such as, for example, extrusion or twin-screw mixers.

EXAMPLES

Implementation of the Tests

Compounding

The compositions are obtained by compounding on a Werner 40, L/D 40, twin-screw extruder equipped with a degassing system and with an extruded string cutter, with a throughput of 40 kg/h and a speed of 150 revolutions/min. The temperature profiles used are as follows:

PA-6 base 240/240/240/240° C.

PA-6,6 base 260/265/265/265° C.

The components of the granules are dry mixed and then introduced into the feed hopper.

Moulding of the Samples

The granules are dried under reduced pressure at a temperature of 80° C. and are then moulded by injection on an injection press of Krauss-Maffei B1 type (60 t of closure) under the following conditions:

PA-6 base
  Material temperature 240–260° C., mould 50° C.
  Injection pressure 45 bars
PA-6 base
  Material temperature 260–280° C., mould 80° C.
  Injection pressure 70 bars.

The standardized test specimens (80×10×4 mm$^3$) thus obtained are conditioned for 14 days at 23° C. and 50% relative humidity.

Evaluation

Flexural modulus according to ISO standard 178

Impact strength on prenotched test specimens of the Charpy type according to ISO standard 179–82 and of the Izod type according to ISO standard 180, at different temperatures (23° C., −20° C., −40° C.). When the crack passes through less than 90% of the thickness at the sample notch bottom, no value can be determined and the reference N.B. (No Break) is reported.

Melt flow index MFI according to ISO standard 1133 under a weight of 2.16 kg and at temperatures of 235° C. and 275° C. for the compositions based respectively on PA-6 and PA-6,6.

Starting Materials

The polyamides tested are polyamide-6 and polyamide-6,6 sold respectively by the company BASF under the references Ultramid B 3 and A 3.

The terpolymers tested are:

Terpo 1 Ethylene/ethyl acrylate/maleic anhydride terpolymer
  68.5/30/1.5% by weight, MFI (190° C., 2.16 kg)=7

Terpo 2 Ethylene/ethyl acrylate/maleic anhydride terpolymer
  64.1/35/0.9% by weight, MFI (190° C., 2.16 kg)=7

Terpo 3 Ethylene/butyl acrylate/maleic anhydride terpolymer
  68.5/30/1.5% by weight, MFI (190° C., 2.16 kg)=5

Terpo 4 Ethylene/ethyl acrylate/GMA terpolymer
  68/24/8% by weight, MFI (190° C., 2.16 kg)=6 (GMA denotes glycidyl methacrylate)

Terpo 5 Ethylene/butyl acrylate/GMA terpolymer
  68/30/2% by weight, MFI (190° C., 2.16 kg)=6

The results obtained with the various compositions based on PA-6,6 and PA-6 are combined in Tables 1 and 2.

Comparative Examples 1 to 6 and 12 to 17

Examples 1–2 and 12–13

Influence of the MAH content of the terpolymer for compositions based respectively on PA-6,6 and PA-6. (MAH denotes maleic anhydride).

Examples 1–3 and 12–14

Influence of the nature of the acrylic ester of the terpolymer for compositions based respectively on PA-6,6 and PA-6.

Whatever the nature of the acrylic ester and the MAH content in the terpolymer incorporated as impact modifier in a PA-6 or PA-6,6 polyamide, a marked improvement in the impact strengths (at room temperature and at low temperatures) can be observed with respect to the reference virgin polyamide.

However, the fluidity of these compositions is greatly reduced with respect to that of the virgin materials PA-6,6 and PA-6. A decrease in the content of MAH reactive group (Terpo 2 w/r to Terpo 1) only results in a slight improvement in the fluidity.

Examples 4 to 6 and 15 to 17

Influence of the content of E/AE/MAH terpolymer in compositions based respectively on PA-6,6 and PA-6.

When the contact of impact modifier of the E/Acrylic ester/MAH type increases in the compositions, the impact strengths are substantially improved while the fluidity is greatly reduced. This is the cause of the difficulty in developing superimpact PA compositions exhibiting a good fluidity.

Examples According to the Invention

Examples 10–11 and 21–22

Influence of the nature of the modifier of E/Acrylic ester/GMA type in compositions based respectively on PA-6,6 and PA-6.

At an identical content of modifier (20%), the Terpo 4 terpolymer containing 8% GMA (Ex. 10 and 21) makes it possible to obtain, with respect to the terpolymers of E/Acrylic ester/MAH type (Ex. 1 to 3 and 12 to 14):

similar impact strengths (slightly lower for compositions based on PA-6,6 and substantially greater for compositions based on PA-6)

similar elastic moduli a greater fluidity.

These compositions based on PA-6,6 or PA-6 and on this terpolymer containing a GMA functional group consequently exhibit a markedly improved impact strength/fluidity compromise with respect to terpolymers containing an MAH functional group.

The reduction in the GMA content in Terpo 5 (2% GMA) makes it possible to obtain good impact strengths while improving the fluidity of the compositions (Ex. 11–22, in comparison with Ex. 10–21), resulting in a better impact strength/fluidity compromise.

Example 7 to 9 and 18 to 20

Influence of the content of E/Acrylic ester/GMA terpolymer in compositions based respectively on PA-6,6 and PA-6.

In comparison with E/Acrylic ester/MAH terpolymers (Ex. 4–5–6 and 15–16–17), E/Acrylic ester/GMA terpolymers make it possible to obtain, whatever the content of modifier introduced (10–15–20%), a greater fluidity of the compositions while retaining similar impact strengths (at room temperature and at low temperatures) in the case of compositions based on PA-6,6, indeed greater impact-strengths in the case of compositions based on PA-6.

Here again, for all these PA-E/Acrylic ester/GMA Terpo formulations, a better impact strength/fluidity compromise is demonstrated, in comparison with PA-E/Acrylic ester/MAH Terpo compositions.

Beyond 25% by weight of impact modifier in the composition, the level of reaction between the modifier and the matrix is such that the final viscosity of the compositions is too high to enable them to be easily used by injection of fine or large-sized components.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

TABLE 1

| Example | Formulation PA-6 | Notched Izod (kJ/m$^2$) 23° C. | -20° C. | -40° C. | Notched Charpy (kJ/m$^2$) 23° C. | -20° C. | -40° C. | Flexural modulus (MPa) | MFI (dg/min) |
|---|---|---|---|---|---|---|---|---|---|
|  | PA-6 | 8 | 6 | 6 | 17 | 11 | 6 | 1974 | 21 |
| 12 | 80% PA-6 + 20% Terpo 1 | NB | 14 | 9 | NB | 24 | 20 | 1281 | 5.1 |
| 13 | 80% PA-6 + 20% Terpo 2 | NB | 11 | 8 | NB | 21 | 17 | 1192 | 5.4 |
| 14 | 80% PA-6 + 20% Terpo 3 | 19 | 14 | 10 | 22 | 23 | 22 | 1262 | 5.6 |
| 15 | 90% PA-6 + 10% Terpo 2 | 17 | 7 | 5 | 21 | 17 | 15 | 1733 | 9.5 |
| 16 | 85% PA-6 + 15% Terpo 2 | 18 | 9 | 6 | 22 | 17 | 16 | 1496 | 6.3 |
| 17 | 80% PA-6 + 20% Terpo 2 | NB | 11 | 8 | NB | 21 | 17 | 1192 | 5.4 |
| 18 | 90% PA-6 + 10% Terpo 4 | 28 | 15 | 10 | 31 | 27 | 18 | 1304 | 13 |
| 19 | 85% PA-6 + 15% Terpo 4 | NB | 17 | 12 | 35 | 32 | 23 | 1147 | 9.5 |
| 20 | 80% PA-6 + 20% Terpo 4 | NB | 17 | 13 | 41 | 30 | 25 | 989 | 6.4 |
| 21 | 80% PA-6 + 20% Terpo 4 | NB | 17 | 13 | 41 | 30 | 25 | 989 | 6.4 |
| 22 | 80% PA-6 + 20% Terpo 5 | NB | 16 | 11 | 40 | 32 | 27 | 980 | 13.3 |

MFI 2.16 kg, PA-6,6 275° C., PA-6 235° C.
Storage 14 days at 23° C., 50% RH

TABLE 2

| Example | Formulation PA-6,6 | Notched Izod (kJ/m$^2$) 23° C. | -20° C. | -40° C. | Notched Charpy (kJ/m$^2$) 23° C. | -20° C. | -40° C. | Flexural modulus (MPa) | MFI (dg/min) |
|---|---|---|---|---|---|---|---|---|---|
|  | PA-6,6 |  |  |  | 16 | 10 | 4.3 | 2592 | 49 |
| 1 | 80% PA-6,6 + 20% Terpo 1 | NB | 16 | 12 | 35 | 31 | 27 | 1391 | 3.8 |
| 2 | 80% PA-6,6 + 20% Terpo 2 | NB | 18 | 12 | 35 | 37 | 29 | 1512 | 4.5 |
| 3 | 80% PA-6,6 + 20% Terpo 3 | NB | 20 | 14 | 36 | 37 | 27 | 1680 | 4.1 |
| 4 | 90% PA-6,6 + 10% Terpo 2 | 17 | 11 | 6 | 29 | 25 | 22 | 1934 | 20 |
| 5 | 85% PA-6,6 + 15% Terpo 2 | 16 | 14 | 10 | 33 | 30 | 28 | 1678 | 13 |
| 6 | 80% PA-6,6 + 20% Terpo 2 | NB | 18 | 12 | 35 | 37 | 29 | 1512 | 4.5 |
| 7 | 90% PA-6,6 + 10% Terpo 4 | 15 | 9 | 7 | 26 | 24 | 22 | 1799 | 41 |
| 8 | 85% PA-6,6 + 15% Terpo 4 | 17 | 11 | 8 | 28 | 26 | 21 | 1748 | 27 |
| 9 | 80% PA-6,6 + 20% Terpo 4 | 29 | 13 | 9 | 33 | 30 | 25 | 1523 | 15 |
| 10 | 80% PA-6,6 + 20% Terpo 4 | 29 | 13 | 9 | 33 | 30 | 25 | 1523 | 15 |
| 11 | 80% PA-6,6 + 20% Terpo 5 | 22 | 12 | 8 | 34 | 28 | 22 | 1512 | 18 |

MFI 2.16 kg, PA-6,6 275° C., PA-6 235° C.
Storage 14 days at 23° C., 50% RH

What is claimed is:

1. A composition comprising a polyamide resin (A) and at least one terpolymer (B) comprising ethylene and an unsaturated epoxide, the terpolymer (B) being obtained by copolymerization or by grafting the epoxide, wherein the melt flow index of the composition is less than the melt flow index of the polyamide resin (A), and wherein the amount of (B) is from 10% to 20% by weight of (A)+(B).

2. Composition according to claim 1, wherein the amount of epoxide of the copolymer (B) can be up to 10% by weight of (B).

3. Composition according to claim 3, wherein the amount of epoxide is from 0.1 to 8%.

4. Composition according to claim 1, wherein (B) is an ethylene alkyl (meth)acrylate/unsaturated epoxide copolymer which can contain up to 40% by weight of (meth)acrylate and up to 10% by weight of unsaturated epoxide.

5. Composition according to claim 4, wherein (B) is an ethylene/alkyl (meth)acrylate/glycidyl (meth)acrylate copolymer containing 20 to 35% by weight of alkyl (meth)acrylate and 0.1 to 8% by weight of glycidyl (meth)acrylate.

6. An impact-resistant polyamide resin composition comprising a polyamide (A) and an amount of a copolymer (B) consisting of ethylene and an unsaturated epoxide, wherein the melt flow index of the composition is greater than the ratio of the melt flow index of the polyamide (A) over 0.175 times the weight percentage of the copolymer (B), wherein the epoxide content is from 0.1 to 3%, and wherein the amount of (B) is from 10% to 20% by weight of (A)+(B).

7. Composition according to claim 6, wherein copolymer (B) of ethylene is a terpolymer ethylene/(meth)acrylate/glycidyl(meth)acrylate.

8. Composition according to claim 6, wherein the amount of (B) in (A)+(B) is from 10 to 15%.

9. Composition according to claim 8, wherein copolymer (B) of ethylene is a terpolymer ethylene/(meth)acrylate/glycidyl(meth)acrylate.

10. An impact-resistant polyamide resin composition comprising a polyamide (A) and a sufficient amount of a copolymer (B) consisting of ethylene and an unsaturated epoxide with a Charpy impact strength at -40° C. from 3 to 6 times that of the polyamide (A) alone, wherein the melt flow index of the composition is greater than the ratio of the melt flow index of the polyamide (A) over 0.175 times the weight percentage of the copolymer (B), wherein the epoxide content is from 0.1 to 3%, and wherein the amount of (B) is from 10% to 20% by weight of (A)+(B).

11. Composition according to claim 10, wherein the amount of (B) in (A)+(B) is from 10 to 15%.

* * * * *